(12) United States Patent
Wippler

(10) Patent No.: US 11,884,242 B2
(45) Date of Patent: Jan. 30, 2024

(54) LIFTGATE ACCESSORY HOOKS WITH SENSORS

(71) Applicant: Toyota Motor Engineering & Manufacturing North America, Inc., Plano, TX (US)

(72) Inventor: Erik A. Wippler, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 47 days.

(21) Appl. No.: 17/681,985

(22) Filed: Feb. 28, 2022

(65) Prior Publication Data

US 2023/0271559 A1   Aug. 31, 2023

(51) Int. Cl.
| | |
|---|---|
| *B60R 7/08* | (2006.01) |
| *B60J 5/10* | (2006.01) |
| *B60R 11/00* | (2006.01) |
| *B60R 7/10* | (2006.01) |

(52) U.S. Cl.
CPC ............ *B60R 7/08* (2013.01); *B60J 5/10* (2013.01); *B60R 7/10* (2013.01); *B60R 11/00* (2013.01); *B60R 2011/004* (2013.01); *B60R 2011/0082* (2013.01)

(58) Field of Classification Search
CPC .. B60R 7/08; B60R 7/10; B60R 7/046; B60R 11/00; B60R 2011/004; B60R 2011/0082; B60R 2011/0021; B60R 2300/301; B60J 5/10; B60J 5/101; B60J 5/107; Y10S 224/927; E05F 15/42
USPC .................. 296/56, 1.07; 224/313
See application file for complete search history.

(56) References Cited

U.S. PATENT DOCUMENTS

| | | | |
|---|---|---|---|
| 4,444,344 A | 4/1984 | Marcus et al. | |
| 5,226,569 A | 7/1993 | Watjer et al. | |
| 8,616,425 B2 | 12/2013 | Gobart et al. | |
| 2005/0073852 A1* | 4/2005 | Ward ............... | E05F 15/44 362/501 |
| 2006/0267365 A1* | 11/2006 | Kowalski ......... | B60R 7/046 296/56 |

(Continued)

FOREIGN PATENT DOCUMENTS

| | | | | |
|---|---|---|---|---|
| CN | 204415271 U | | 6/2015 | |
| DE | 19836991 C1 | * | 5/2000 | ............ B60R 7/10 |

(Continued)

OTHER PUBLICATIONS

Procopiescu, Gabriel. DE 102019119364 A1 machine translation, Jan. 21, 2021 (Year: 2021).*

(Continued)

*Primary Examiner* — Amy R Weisberg
*Assistant Examiner* — Wenwei Zhuo
(74) *Attorney, Agent, or Firm* — Dinsmore & Shohl LLP

(57) ABSTRACT

Liftgate assemblies with accessory hooks are disclosed. A liftgate assembly includes a door assembly movable in a vehicle vertical direction to an open position. The door assembly includes an interior surface panel, at least one hook disposed on the interior surface panel, and a controller communicatively coupled to the door assembly. The controller is configured to determine a presence of an item suspended from the hook when the door assembly is in the open position, transmit an alert, and prevent the door assembly from closing.

10 Claims, 3 Drawing Sheets

(56) References Cited

U.S. PATENT DOCUMENTS

2011/0163141 A1* 7/2011 Lucas ................... B60R 11/00
                                                          224/547
2019/0017311 A1* 1/2019 McGettrick ........... E05F 15/697
2022/0324310 A1* 10/2022 Aitharaju ................ B32B 15/14

FOREIGN PATENT DOCUMENTS

| DE | 102019119364 A1 * | 1/2021 |
| KR | 19990074190 A | 10/1999 |
| KR | 100858193 B1 | 9/2008 |
| RU | 2610327 C1 * | 2/2017 |

OTHER PUBLICATIONS

Eggerstedt et al. DE 19836991 C1 machine translation, May 25, 2000 (Year: 2000).*
Korovin et al. RU 2610327 C1 machine translation, Feb. 9, 2017 (Year: 2017).*

* cited by examiner

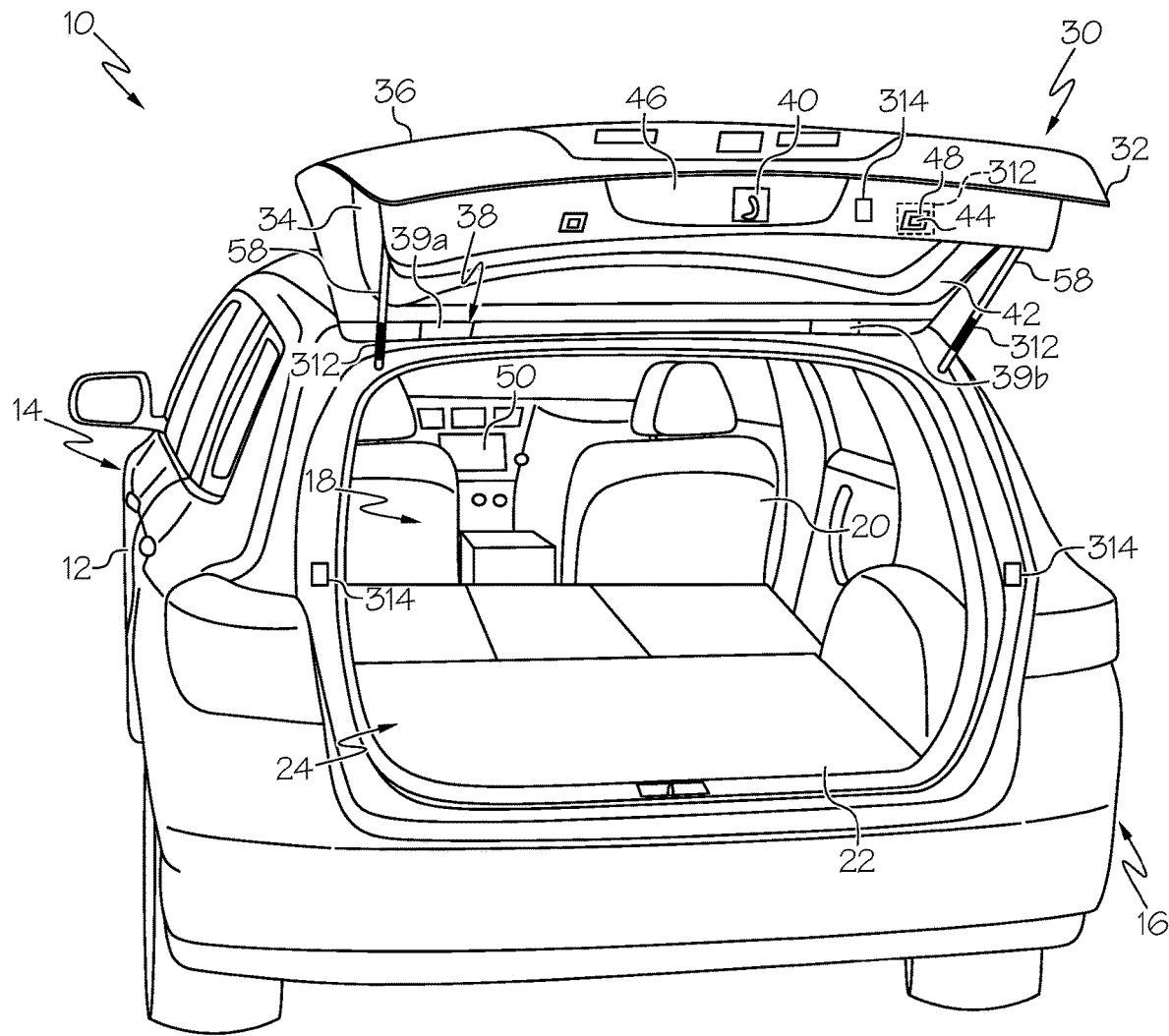
FIG. 1
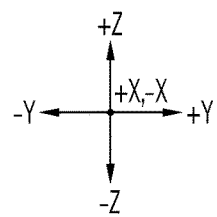

LIFTGATE ACCESSORY HOOKS WITH SENSORS

TECHNICAL FIELD

The present specification generally relates to vehicle liftgate assemblies and, more specifically, to vehicle liftgate assemblies that include accessory hooks.

BACKGROUND

Vehicles may include a rear lift gate to gain access to the rear of the vehicle. Liftgates may contain various molding and other trim components for covering gaps and to provide an aesthetic appearance. However, there are no components, such as hooks or the like, on the rear liftgate or trim panels to hang items such as clothes or bags when the liftgate is open. Further, in the event that a rear door or liftgate is power operated, items hanging from the hooks may interfere with automatic closing of the liftgate.

SUMMARY

In one embodiment, a vehicle includes a liftgate assembly including a door assembly moveable in a vehicle vertical direction to an open position. The door assembly includes an interior surface panel with at least one hook disposed on the interior surface panel. The door assembly also includes a controller communicatively coupled to the door assembly. The controller is configured to determine a presence of an item suspended from the hook when the door assembly is in the open position, transmit an alert, and prevent the door assembly from closing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 depicts a rear view of a vehicle including an illustrative liftgate assembly, according to one or more embodiments shown and described herein;

DETAILED DESCRIPTION

Figure 2:
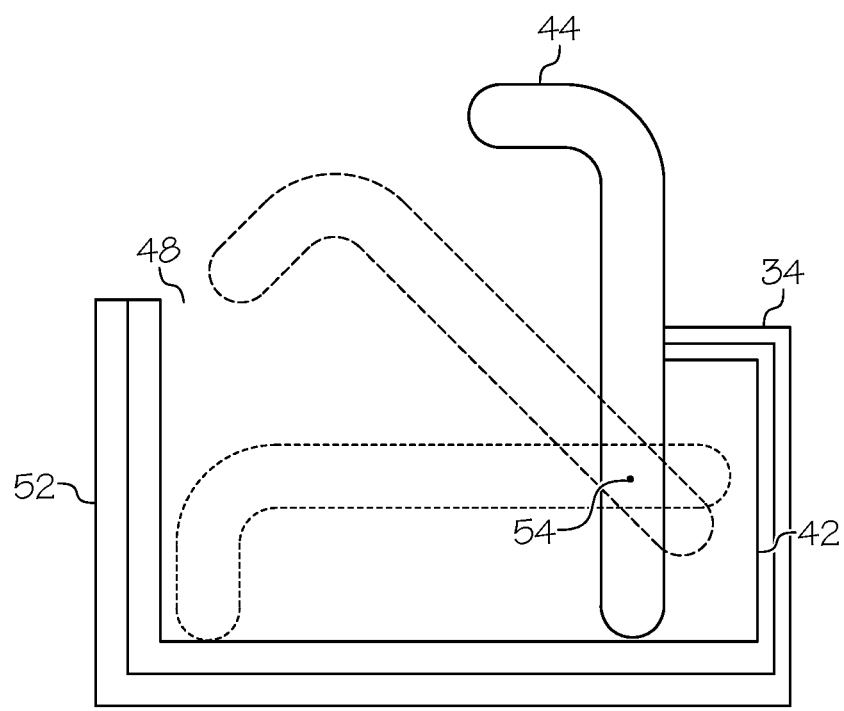
FIG. 2 is schematic view of an illustrative accessory hook of the liftgate assembly of FIG. 1, according to one or more embodiments shown and described herein.

Embodiments described herein are generally related to vehicles including vehicle liftgate assemblies that include a door assembly moveable in a vehicle vertical direction between an open position where access to an interior of the vehicle through the rear is provided and a closed position where access to the interior of the vehicle is blocked. The door assembly includes an interior surface panel with at least one hook disposed on the interior surface panel. The vehicle also includes one or more sensors for sensing the presence of an item hanging on the at least one hook. In addition, a controller is communicatively coupled to the one or more sensors. The controller is configured to determine a presence of an item suspended from the hook when the door assembly is in the open position, transmit an alert, and prevent the door assembly from closing.

As used herein, the term "vehicle longitudinal direction" refers to the forward-rearward direction of the vehicle 10 (i.e., in the +/− vehicle X-direction depicted in FIG. 1). The term "vehicle lateral direction" refers to the cross-vehicle direction of the vehicle (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Referring now to FIG. 1, a vehicle 10 according to various embodiments is illustrated. It is noted that while the vehicle 10 is depicted as a sport utility vehicle, the vehicle 10 may be any passenger vehicle 10, such as a hatchback, a sedan, a coupe, a van, a minivan, or the like. In addition, the vehicle may be, for example, any other terrestrial, aquatic, and/or airborne vehicle. The vehicle 10 includes a front 14, a rear 16, and a body 12 that extends between the front 14 and the rear 16 in the vehicle longitudinal direction. The body 12 of the vehicle 10 defines an interior passenger compartment 18. The interior passenger compartment 18 is located between the front 14 and the rear 16 of the vehicle 10. The interior passenger compartment 18 contains one or more passenger seats 20. In embodiments, the vehicle 10 includes a display 50 located in the interior passenger compartment 18. The display 50 provides visual output such as, for example, maps, navigation, entertainment, information, or a combination thereof. In embodiments, and discussed in further detail below, the display 50 may receive one or more physical inputs directly from a user.

In embodiments, the rear 16 of the vehicle 10 includes a liftgate assembly 30 that can be used to cover a rear storage space 24 with the liftgate assembly 30 in a closed configuration. In embodiments, one or more of the passenger seats 20 further define the rear storage space 24 in the vehicle longitudinal direction. The rear storage space 24 of the vehicle 10 is defined in vehicle lateral direction by the body 12. The rear storage space 24 of the vehicle 10 is defined in the vehicle vertical direction by a floor 22 of the interior passenger compartment 18.

Still referring to FIG. 1, the rear 16 of the vehicle 10 is illustrated with the liftgate assembly 30 in an open configuration. The liftgate assembly 30 includes a door assembly 32. The door assembly 32 may be constructed from rigidly interconnected door frame members and door panels, as well as any combination of overlying panels, trim, upholstery and other door coverings. The door assembly 32 may include an interior surface panel 34 and/or an exterior surface panel 36. In some embodiments, there may be additional outer and/or inner door panels. The interior surface panel 34 and the exterior surface panel 36 are spaced apart from one another in the vehicle longitudinal direction. In embodiments, the interior surface panel 34 is connected to the exterior surface panel 36 by a base portion 46. In embodiments, the base portion 46 is integral with the interior surface panel 34. In embodiments, the base portion 46 is attached to the interior surface panel 34 using any suitable means of fixing, such as, but not limited to, welding, fasteners, adhesives, and/or the like. In embodiments, the base portion 46 is approximately the same length as the door assembly 32 in the vehicle lateral direction. In the vehicle longitudinal direction, the base portion 46 may be approximately the same distance as the space between the interior surface panel 34 and the exterior surface panel 36. In embodiments, the base portion 46 is in contact with the floor 22 of the rear storage space 24 when the door assembly 32 is in the closed position.

In embodiments, the liftgate assembly 30 includes a trim panel 42 disposed on the interior surface panel 34 of the door assembly 32. The trim panel 42 may provide a visually appealing appearance to the liftgate assembly 30. In some embodiments, the trim panel 42 may be textured and/or have a color matching the appearance of the interior passenger compartment 18 of the vehicle 10, for example, using a spray coating or other material. The trim panel 42 may be secured to the interior surface panel 34 of the door assembly 32 using any suitable means, including but not limited to, screws, adhesives, fasteners, hinges, heat stakes, and the like. The trim panel 42 may be formed from any suitable material, such as, but not limited to, plastics, textiles, combinations thereof, and the like. The trim panel 42 may be formed using any suitable process (e.g. injection molding, etc).

In embodiments, a hinge assembly 38 includes a pair of hinge arms 39a and 39b that rotatably connect the door assembly 32 to the body 12 and can allow for movement of the liftgate assembly 30 between the open and closed configurations. In some embodiments, the hinge assembly 38 may be biased toward the open configuration such that the liftgate assembly 30 tends to move toward the open configuration upon unlatching of a liftgate latch assembly 40. The liftgate latch assembly 40 can be locked in the closed configuration, which can inhibit access to the rear storage space 24.

As is described in further detail below, the liftgate assembly 30 may include one or more hooks 44 for hanging articles, such as shopping bags, tools, clothing etc., from the interior surface panel 34 of the door assembly 32 when the liftgate assembly 30 is in the open configuration. As used herein, the term "article" and "item" may be used interchangeably and may refer to any object suspended from the hook 44. As used herein, the term "hook" may refer to any apparatus for hanging articles from the interior surface panel 34 of the door assembly 32. The type of hook 44 may include, but is not limited to, J-shaped hooks, L-shaped hooks, C-shaped hooks, S-shaped hooks, round hooks, swivel hooks, eye hooks, snap hooks, pegs, knobs, rods, recesses, and the like.

The hook 44 may be disposed on the door assembly 32. In embodiments, the hook 44 may be disposed on the interior surface panel 34 and/or the trim panel 42. In embodiments, the hook 44 may be disposed on the base portion 46 of the interior surface panel 34. The hook 44 may include any configuration suitable to support an item disposed thereon. In embodiments, the hook 44 may be collapsably coupled to the interior surface panel 34 and/or the trim panel 42, such that the hook 44 has a collapsed configuration and an extended configuration. In embodiments, the hook 44 may be integral with the interior surface panel 34 and/or trim panel 42. In embodiments, the hook 44 may be removably or permanently secured to the interior surface panel 34 and/or trim panel 42.

In embodiments, the liftgate assembly 30 further includes one or more recesses 48 defined by the interior surface panel 34 of the door assembly 32 and/or the trim panel 42. In other embodiments, the interior surface panel 34 and/or the trim panel 42 are constructed without the recesses 48. In embodiments, the hook 44 may be stored within the recess 48 when in the collapsed configuration.

Referring now to FIG. 2, the recess 48 is further defined by sidewalls 52. The hook 44 may be coupled to the sidewalls 52 in any conventional manner. In embodiments, the hook 44 may be coupled to the sidewalls 52 at a pivot point 54 (e.g., a pivot pin or the like). In operation, the hook 44 may be moved (e.g., rotated about the pivot point 54) from the collapsed position, wherein the hook 44 is generally stored in the recess 48, to an extended position, wherein at least a portion of the hook 44 extends beyond the sidewalls 52 of the recess 48. When the hook 44 is in the collapsed position, the hook 44 may be pivoted away from the door assembly 32, such that the hook 44 at least partially extends from the recess 48. Articles may then be suspended from the hook 44 when in the extended position.

When the hook 44 is no longer in use, the hook 44 may be returned to the collapsed position by pivoting the hook 44 around the pivot point 54 toward the interior surface panel 34 such that the hook 44 is stored within the recess 48. In some embodiments, the hook 44 can be manually pivoted. In other embodiments, the hook 44 may be coupled to a motor or the like that causes pivot movement via the liftgate control system 300 discussed below.

While FIGS. 1 and 2 relate to pivoting the hook 44 between extended and collapsed positions, it should be appreciated that this is merely one illustrative example of hook movement. That is, in other examples, the hook 44 may be configured to move in and out of the door assembly 32 in a linear motion. That is, the hook 44 may include stop members that are received within a rotatable cam body that sits within a recess of the door assembly 32. In addition, a biasing member such as a spring may bias the hook in the extended position. When a force is placed on the hook 44 to push the hook 44 toward the door assembly 32 (e.g., into the door assembly 32) and overcome the biasing force, the cam body may rotate to lock the hook 44 within a recess of the door assembly 32 in the collapsed position. Another force placed on the hook 44 while in the collapsed position may cause further rotation of the cam body, and the biasing force causes the hook 44 to move to the extended position.

Referring again to FIG. 1, although the liftgate assembly 30 may be operated manually, in embodiments, the liftgate assembly 30 may be power operated, such as by user input (e.g. a key fob, a personal computing device, etc.) or automatically, for example based on some sensed input. For example, a vehicle ECU may operate the liftgate assembly 30 in response to an input received from a key fob.

In embodiments, the vehicle 10 may include a one or more sensors (e.g., load sensors 312 and/or optical sensors 314) that are generally adapted to detect when an item is suspended from the hook 44. For example, one or more load sensors 312 may be integrated with portions of the door assembly 32 such that, when an item is suspended from the hook 44, an increased load is detected by the load sensors 312. Illustrative locations of such load sensors, as depicted in FIG. 1, include a load sensor 312 integrated with the hook 44, one or more load sensors integrated with struts 58 that support the door assembly 32 in the open configuration (or similar device/mechanism), and/or the like. In another example, one or more optical sensors 314 may be integrated with portions of the vehicle 10 to optically detect when an item is suspended from the hook 44. Illustrative locations of such optical sensors 314, as depicted in FIG. 1, include on the base portion 46 such that a field of view of the optical sensors 314 includes the hook 44, on the body 12 of the vehicle (e.g., on portions of the body that provide a field of view of the opening into the rear storage space 24) and/or the like. Additional details regarding the various sensors will be described herein with respect to FIG. 3.

Figure 3:
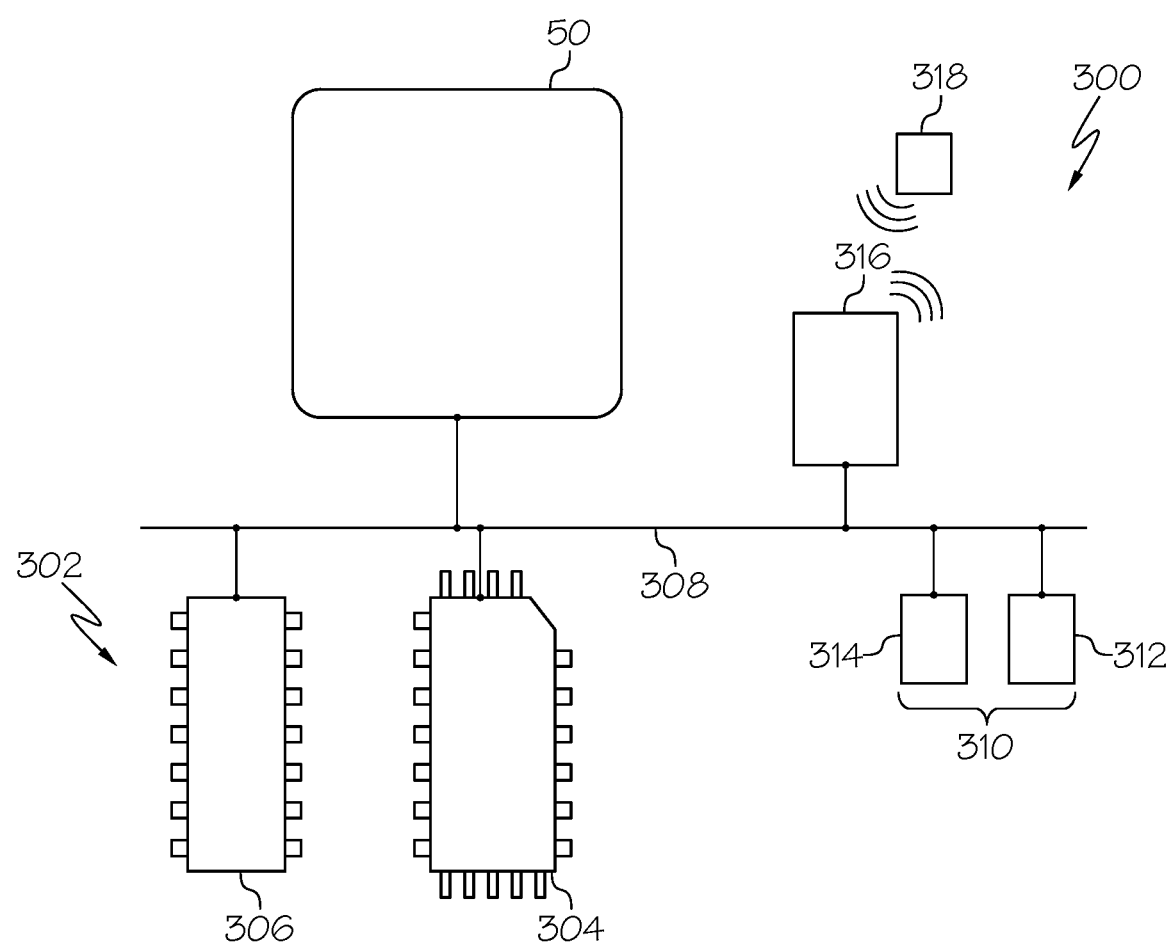
FIG. 3 is an schematic view of an illustrative liftgate control system for use with the vehicle of FIG. 1, according to one or more embodiments shown and described herein.

Referring now to FIG. 3, a liftgate control system 300 of the liftgate assembly 30 is schematically illustrated. The liftgate control system 300 includes a controller 302, a processor 304, a memory module 306, a communication line 308, and one or more sensors 310. The liftgate control system 300 may further include the display 50 and a communications module 316 for communicatively coupling the vehicle 10 to an external device 318. The controller 302 may be any device configured to control operations of the various modules of the liftgate control system 300, such as an ECU. The controller 302 is communicatively coupled over the communication line 308 to the door assembly 32 to control operation of the door assembly 32.

The liftgate control system 300 includes one or more processors 304 in the controller 302 and elsewhere in the liftgate control system 300. The one or more processors 304 may each be any device capable of executing machine readable instructions. The one or more processors 304 may be coupled to the communication line 308 that provides signal interconnectivity between various modules disposed within the liftgate control system 300. Accordingly, the communication line 308 may communicatively couple any number of processors with one another, and allow the modules coupled to the communication line 308 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

In embodiments, the communication line 308 includes a conductive material that permits the transmission of electrical data signals to processors, memories, sensors, and actuators throughout the liftgate control system 300. The communication line 308 may be formed from any medium that is capable of transmitting a signal such as, for example, conductive wires, conductive traces, optical waveguides, or the like. In some embodiments, the communication line 308 may facilitate the transmission of wireless signals, such as WiFi, Bluetooth, and the like. Moreover, the communication line 308 may be formed from a combination of mediums capable of transmitting signals. In one embodiment, the communication line 308 comprises a combination of conductive traces, conductive wires, connectors, and buses that cooperate to permit the transmission of electrical data signals to components such as processors, memories, sensors, input devices, output devices, and communication devices. Accordingly, the communication line 308 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The memory module 306 is communicatively coupled to the processor 304 over the communication line 308. The memory module 306 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the liftgate control system 300 and/or external to the liftgate control system 300. The memory module 306 may be configured to store one or more pieces of logic, as described in more detail below. The memory module 306 may include one or more memory modules. The embodiments described herein may utilize a distributed computing arrangement to perform any portion of the logic described herein.

Embodiments of the present disclosure include logic stored on the memory module 306 that includes machine-readable instructions and/or an algorithm written in any programming language of any generation (e.g., 1GL, 2GL, 3GL, 4GL, and/or 5GL) such as, machine language that may be directly executed by the processor 304, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described herein, logic as implemented by the controller 302 allows the liftgate control system 300 to prevent the door assembly 32 from closing while the hook 44 (FIG. 1) is in use (e.g., when an item is suspended from the hook 44).

The liftgate control system 300 may include the one or more sensors 310 communicatively coupled to the one or more processors 304 over the communication line 308. The one or more sensors 310 are configured to output a signal indicative of the presence of an article on the hook 44. The one or more sensors 310 may include the optical sensors 314 (e.g., cameras, laser scanners, and IR scanners, light sensors) and/or the load sensors 312 (e.g. strain gauges, load cells, etc.), or any combination thereof that output a signal indicative of the presence of an article on the hook 44 (FIG. 1).

For example, optical sensors 314 may be used to optically identify an item suspended from the hook 44. In some embodiments, the controller 302 may be operable to perform object recognition to identify the placement and/or type of object and differentiate between circumstances where the door assembly 32 should be prevented from closing versus allowing the door assembly 32 to close. In some embodiments, the load sensors 312 may be used by the controller 302 to confirm that the hook is in use, such as by using weight measurements, pressure on the hook 44, and the like.

As discussed briefly above, the vehicle 10 may include a display 50 for providing visual output. The display 50 may be coupled to the communication line 308. Accordingly, the communication line 308 can communicatively couple the display 50 to other modules of the vehicle 10. The display 50 may include any medium capable of transmitting an optical output such as, for example, a cathode ray tube, light emitting diodes, a liquid crystal display, a plasma display, or the like. Moreover, the display 50 may be a touch screen that, in addition to providing optical information, detects the presence and location of a tactile input upon a surface of or adjacent to the display 50. Accordingly, the display 50 may receive mechanical input directly upon the optical output provided by the display 50. In this regard, the display 50 can function as a user input that allows for user control of the liftgate assembly 30. Additionally, it is noted that the display 50 can include at least one of the one or more processors 304 and the one or memory modules 306. The display 50 could be at least one of a heads-up display, an instrument cluster display, and a mobile device display. In some embodiments, the vehicle 10 may have a plurality of displays. In such embodiments, the vehicle 10 could also have a plurality of different types of displays. For example, and not as a limitation, the vehicle 10 could have an in-dashboard display and a heads-up display for displaying information directly on a windshield or other window of the vehicle 10.

The vehicle may also include a communications module 316 for communicatively coupling the vehicle 10 to an external device 318, such as a key fob or personal computing device. The communications module 316 can be communicatively coupled to the communication line 308 and can be any device capable of transmitting and/or receiving data via a network. Accordingly, the communications module 316 can include a communication transceiver for sending and/or receiving any wired or wireless communication. For example, the communications module 316 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the communications module 316 includes hardware configured to operate in accordance with the Bluetooth wireless communication protocol.

In some embodiments, the controller 302 may, upon the detection of the presence of an article on the hook 44, execute logic to generate and output a notification to alert the user to the presence of the item and/or the inability of the door assembly 32 to close. In embodiments, the controller 302 may provide visual, audible, and/or tactile alerts to the user. For example, visual alerts may include prompts with the display 50, flashing the lights of the vehicle (not shown), or providing another visual output to alert the user. In embodiments, the controller 302 may alert the user to the presence of the item using an audible alert (e.g., a chime, ring, verbal alert, or the like) issued, for example, through a vehicle speaker system (not shown). In embodiments, the controller 302 may alert the user to the presence of the item using a tactile alert, such as vibration in the passenger seats 20 or steering wheel (not shown). In other embodiments, the controller 302 may alert the user to the presence of the item using an alert delivered to the external device 318. This alert may be a visual alert, an audible alert, or a tactile alert.

It should now be appreciated that the assemblies described herein generally include a door assembly having at least one hook disposed on an interior surface panel thereof. In addition, one or more sensors sense the presence of an item hanging on the at least one hook. A controller communicatively coupled to the one or more sensors is configured to determine a presence of an item suspended from the hook when the door assembly is in the open position, transmit an alert, and/or prevent the door assembly from closing.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A liftgate assembly, comprising:
   a door assembly movable in a vehicle vertical direction to an open position, said door assembly comprising an interior surface panel;
   at least one hook disposed on the interior surface panel;
   a controller communicatively coupled to the door assembly, the controller configured to determine a presence of an item suspended from the hook when the door assembly is in the open position, transmit an alert, and prevent the door assembly from closing; and
   a load sensor communicatively coupled to the controller and positioned between the at least one hook and the interior surface panel.

2. The liftgate assembly of claim 1, wherein the door assembly further comprises a trim panel disposed on the interior surface panel and wherein the hook is disposed on the trim panel.

3. The liftgate assembly of claim 1, wherein the interior surface panel further comprises a base portion in contact with a floor of a rear storage space when the door assembly is in a closed position.

4. The liftgate assembly of claim 3, wherein the hook is disposed on the base portion of the interior surface panel.

5. The liftgate assembly of claim 1, wherein the hook is collapsably coupled to the interior surface panel, such that the hook has an extended position and a collapsed position.

6. The liftgate assembly of claim 5, wherein the interior surface panel defines a recess, such that the hook is stored within the recess when in the collapsed position.

7. The liftgate assembly of claim 1, further comprising an optical sensor communicatively coupled to the controller, the optical sensor configured to sense the presence of the item and transmit a signal corresponding to the presence to the controller.

8. The liftgate assembly of claim 1, wherein the load sensor is configured to sense the presence of the item and transmit a signal corresponding to the presence to the controller.

9. The liftgate assembly of claim 1, wherein the alert is an audible alert.

10. The liftgate assembly of claim 1, wherein the controller is communicatively coupled to an external device such that the controller can transmit the alert to the external device.

* * * * *